United States Patent
Nilsson et al.

(10) Patent No.: US 12,397,740 B2
(45) Date of Patent: *Aug. 26, 2025

(54) ADAPTIVE SEATBELT GEOMETRY COMPRISING A WEBBING GUIDE

(71) Applicant: Volvo Car Corporation, Gothenburg (SE)

(72) Inventors: Tomas Nilsson, Kungsbacka (SE); Gert Aldeborg, Uddevalla (SE); Sebastian Karlsson, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 167 days.

This patent is subject to a terminal disclaimer.

(21) Appl. No.: 18/335,727

(22) Filed: Jun. 15, 2023

(65) Prior Publication Data
US 2024/0416865 A1    Dec. 19, 2024

(51) Int. Cl.
*B60R 22/48* (2006.01)
*B60R 22/20* (2006.01)
*B60R 22/34* (2006.01)

(52) U.S. Cl.
CPC .............. *B60R 22/48* (2013.01); *B60R 22/20* (2013.01); *B60R 2022/208* (2013.01); *B60R 2022/3421* (2013.01); *B60R 2022/4816* (2013.01); *B60R 2022/485* (2013.01)

(58) Field of Classification Search
CPC ............ B60R 22/20–206; B60R 22/48; B60R 2022/207; B60R 2022/208; B60R 2022/3421; B60R 2022/4816; B60R 2022/485
See application file for complete search history.

(56) References Cited

U.S. PATENT DOCUMENTS 10,173,634 B2 * 1/2019 Loew ...................... B60R 22/20
11,420,579 B2 * 8/2022 Baltaxe ............. B60R 21/01552

FOREIGN PATENT DOCUMENTS

CN    112550212 A  *  3/2021

OTHER PUBLICATIONS

Jian, H. CN-112550212-A, machine translation. (Year: 2021).*

* cited by examiner

*Primary Examiner* — Phutthiwat Wongwian
*Assistant Examiner* — Mark L. Greene
(74) *Attorney, Agent, or Firm* — Amin, Turocy & Watson, LLP

(57) ABSTRACT

Various systems and methods are presented regarding automatically controlling a position of a seat belt located onboard a vehicle, wherein the position is controlled in accordance with physiology of an occupant utilizing the seat belt. By adjusting the position of the seat belt in accordance with the occupant's physiology, the seat belt system can be configured to improve operation of the seat belt in restraining the occupant during vehicle deceleration. Position of the seat belt can be controlled by a guidance device comprising a positionable guide pin which changes alignment of the seatbelt. A motor can be utilized to control positioning of the pin, wherein the motor can be controlled by a system configured to receive data from one or more sensors regarding any of the occupant's physiology, operation of the seat belt, position of the pin, and suchlike.

20 Claims, 11 Drawing Sheets

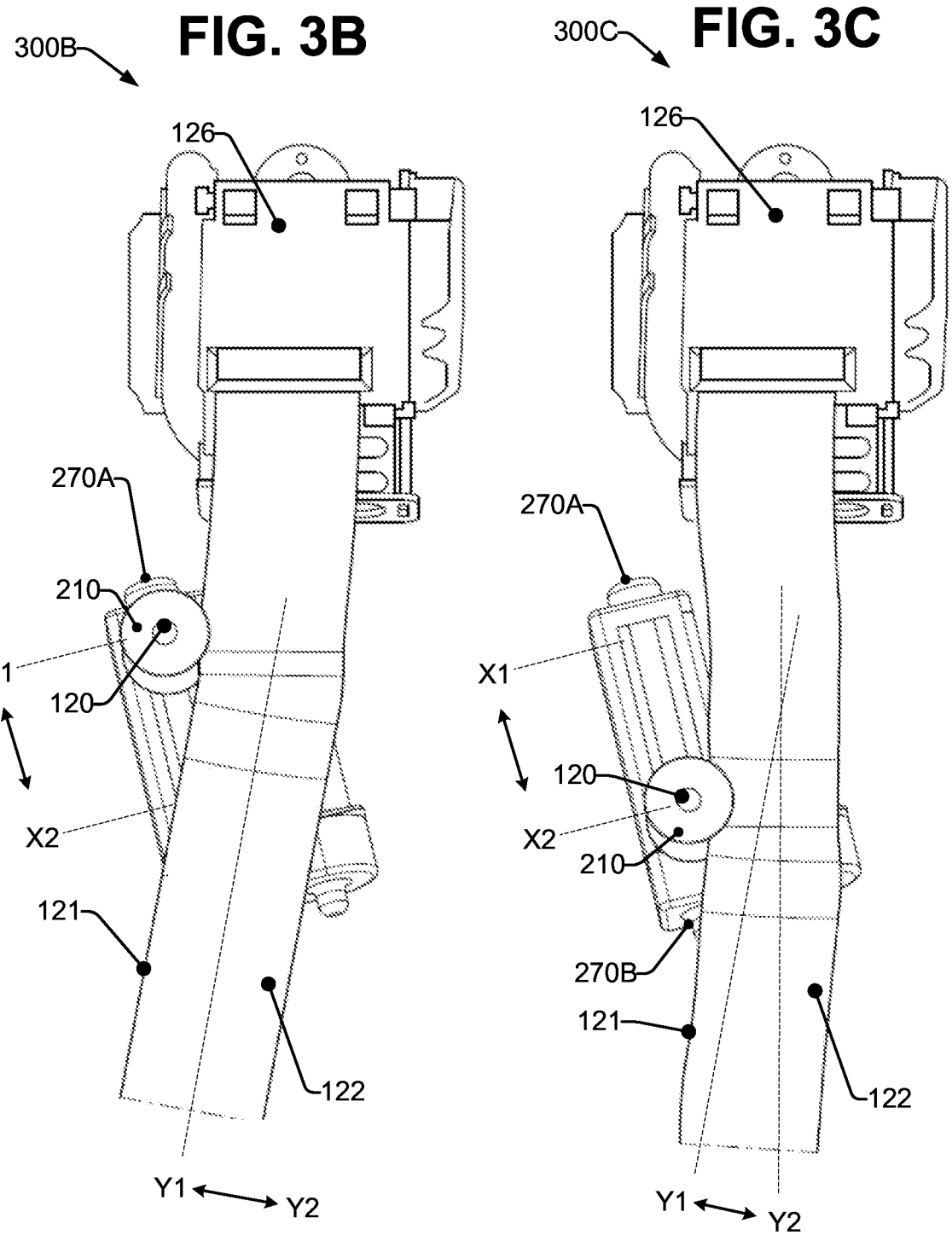

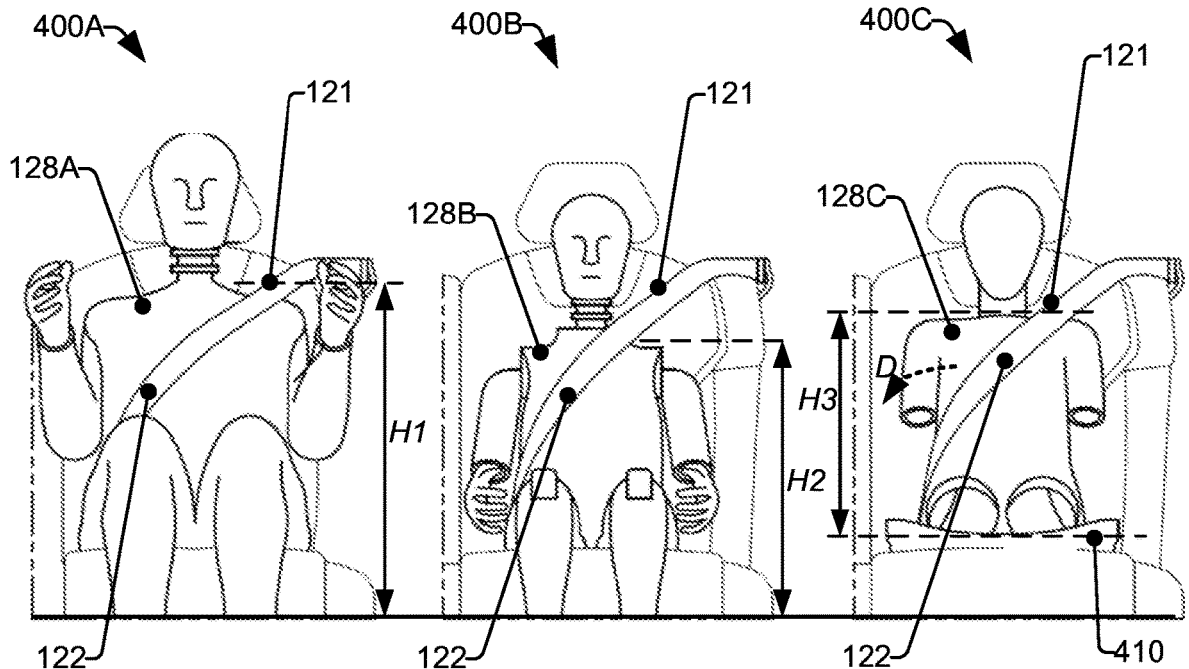
FIG. 4A (50% M)  FIG. 4B (5% AF)  FIG. 4C (Q10)
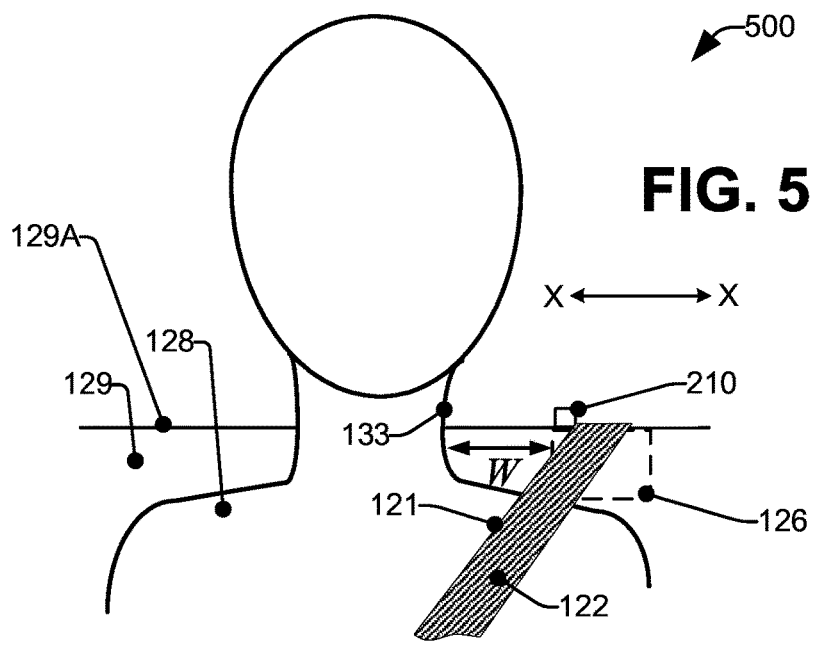
FIG. 5

ADAPTIVE SEATBELT GEOMETRY COMPRISING A WEBBING GUIDE

TECHNICAL FIELD

The present disclosure generally relates to a seat belt system configured to adapt to an occupant's physiology.

BACKGROUND

Designing a ubiquitous seat belt system for a vehicle is hindered as a function of the respective physiology of a first occupant who may sit in a seat versus a second occupant who may sit in the seat. To address the issue, crash test dummies have been developed based on various physiologies, e.g., an adult male, an adult female, a child sat in a booster seat, etc. However, a seat belt system that provides an optimal placement of the seat belt webbing regarding a first occupant's torso, distance of the webbing from the occupant's neck, securely locating the occupant in a seat, etc., may give rise to a less than optimal seat belt placement for a second occupant having a different physiology. For example, an edge of the webbing may rub on a smaller person's neck/sternum (e.g., female adult frame versus larger male adult frame). In another example, a seat belt configuration that acts to restrain a first occupant in the event of an accident, can be unsecure regarding a second occupant to the point that the second occupant twists out from under the seat belt during an accident (e.g., the small frame of a 10 year old child sat on a booster seat versus a larger male adult frame).

The above-described background is merely intended to provide a contextual overview of some current issues and is not intended to be exhaustive. Other contextual information may become further apparent upon review of the following detailed description.

SUMMARY

The following presents a summary to provide a basic understanding of one or more embodiments described herein. This summary is not intended to identify key or critical elements, or delineate any scope of the different embodiments and/or any scope of the claims. The sole purpose of the summary is to present some concepts in a simplified form as a prelude to the more detailed description presented herein.

In one or more embodiments described herein, systems, devices, computer-implemented methods, methods, apparatus and/or computer program products are presented regarding an adaptive seat belt system that can be configured to adjust to/accommodate a range of respective physiologies of persons who sit in a seat onboard a vehicle, thereby enabling a seat belt system to secure a wide variety of persons.

According to one or more embodiments, a system can be located on a vehicle, The system can comprise a memory that stores computer executable components and a processor that executes the computer executable components stored in the memory. The computer executable components can comprise an adaptive seat belt component (ASBC) configured to determine physiology of an occupant located in a seat onboard the vehicle. In another embodiment, the ASBC can further determine a position of a seat belt webbing in accordance with the occupant's physiology, and in a further embodiment, adjust position of the seat belt webbing in accordance with the occupant's physiology. In an embodiment, the seat belt can be a three-point seat belt system.

In another embodiment, the ASBC can be further configured to receive, from a first sensor, occupant data regarding the physiology of the occupant, and further, based on the occupant data, generate a position instruction to adjust the position of the seat belt webbing in accordance with the occupant's physiology. In another embodiment, the ASBC can be further configured to transmit the position instruction to a guidance device, wherein the guidance device is configured to adjust the position of the seat belt webbing in response to the position instruction. In an embodiment, the first sensor can be a camera or a radar device. In an embodiment, the guidance device can include a pin, wherein the edge of the seat belt webbing locates against the pin, and adjustment in position of the pin causes a respective adjustment in the position of the edge of the seat belt webbing relative to the occupant's neck.

In a further embodiment, the ASBC can be configured to receive, from a second sensor, seat belt data regarding a position of an edge of the seat belt webbing relative to the occupant's body, wherein the position instruction is configured to place the edge of the seat belt webbing at a defined distance between the occupant's neck and the edge of the seat belt webbing.

In another embodiment, the ASBC can be configured to receive seat belt fasten data, the seat belt fasten data indicates whether a tongue located on the seat belt is inserted in a buckle utilized to secure the seat belt, wherein the seat belt fasten data is received from another sensor located in the seat belt buckle. In response to a determination that the seat belt fasten data indicates the tongue is released from the seat buckle, the ASBC can be further configured to transmit a second position signal to the device, wherein the second position instructs the device to return to an initial position, wherein the initial position places the seat belt webbing in a position to enable the car seat to be lowered. In another embodiment, the ASBC can be configured to, in response to a determination that the seat belt fasten data indicates the tongue is released from the seat buckle, cease at least one of determining physiology of the occupant or positioning of the seat belt webbing.

In other embodiments, elements described in connection with the disclosed systems can be embodied in different forms such as computer-implemented methods, computer program products, or other forms. For example, in an embodiment, a computer-implemented method can be performed by a device operatively coupled to a processor, wherein the device can be located on a vehicle. In an embodiment, the method can comprise: determining, by a device comprising a processor located on a vehicle, physiology of an occupant located in a seat onboard the vehicle, further determining, by the device, a position of a seat belt webbing in accordance with the occupant's physiology; and further adjusting, by the device, position of the seat belt webbing in accordance with the occupant's physiology.

In another embodiment, the method can further comprise receiving, at the device from a first sensor, occupant data regarding the physiology of the occupant, and further, based on the occupant data, generating, by the device, a position instruction to adjust the position of the seat belt webbing in accordance with the occupant's physiology. In a further embodiment, the method can further comprise transmitting, by the device, the position instruction to a webbing guide device, wherein the webbing guide device is configured to adjust the position of the seat belt webbing in response to the position instruction. In an embodiment, the first sensor can comprise a camera or a radar device. In an embodiment, the webbing guide device includes a webbing guide component comprising a pin, wherein the edge of the seat belt webbing locates against the pin, and adjustment in position of the pin causes a respective adjustment in the position of the edge of the seat belt webbing relative to the occupant's neck.

In another embodiment, the method can further comprise receiving, at the device from a second sensor, seat belt data regarding a position of an edge of the seat belt webbing relative to the occupant's body, wherein the position instruction can be configured to place the edge of the seat belt webbing at a defined distance between the occupant's neck and the edge of the seat belt webbing. In another embodiment, the method can further comprise receiving, at the device, seat belt fasten data, the seat belt fasten data indicates whether a tongue located on the seat belt is inserted in a buckle utilized to secure the seat belt, wherein the seat belt fasten data is received from a second sensor located in the seat belt buckle. In another embodiment, the method can further comprise, in response to a determining, by the device, that the seat belt fasten data indicates the tongue is released from the seat buckle, transmitting a second position signal to the webbing guide device, wherein the second position instructs the webbing guide device to return to an initial position, wherein the initial position places the seat belt webbing in a position to enable the car seat to be lowered, and further terminating, by the device, at least one of determining physiology of the occupant or positioning of the seat belt webbing.

Further embodiments can include a computer program product comprising a computer readable storage medium having program instructions embodied therewith, the program instructions executable by a processor, located on a vehicle, can cause the processor to determine physiology of an occupant located in a seat onboard the vehicle, determine a position of a seat belt webbing in accordance with the occupant's physiology; and further adjust position of the seat belt webbing in accordance with the occupant's physiology.

In another embodiment, the program instructions are further executable by the processor to cause the processor to receive, from a first sensor, occupant data regarding the physiology of the occupant, based on the occupant data, generate a position instruction to adjust the position of the seat belt webbing in accordance with the occupant's physiology, and further transmit the position instruction to a guidance device, wherein the guidance device is configured to adjust the position of the seat belt webbing in response to the position instruction. In an embodiment, the guidance device includes a webbing guide component comprising a pin, wherein the edge of the seat belt webbing locates against the pin, and adjustment in position of the pin causes a respective adjustment in the position of the edge of the seat belt webbing relative to the occupant's neck.

In another embodiment, the program instructions are further executable by the processor to cause the processor to receive, from a second sensor, seat belt data regarding a position of an edge of the seat belt webbing relative to the occupant's body, wherein the position instruction is configured to place the edge of the seat belt webbing at a defined distance between the occupant's neck and the edge of the seat belt webbing.

An advantage of the one or more systems, computer-implemented methods, and/or computer program products can be utilizing various systems and technologies located on a vehicle to determine positioning of a seat belt webbing based on an occupant's physiology. Hence, rather than a single, ubiquitous approach being utilized for seatbelt(s) in a vehicle, the seatbelt configuration can be adjusted based on the occupant's physique.

DESCRIPTION OF THE DRAWINGS

One or more embodiments are described below in the Detailed Description section with reference to the following drawings.

FIGS. 3A-C present systems illustrating various configurations for automatically controlling placement of a seat belt webbing relative to a vehicle occupant, in accordance with an embodiment.

FIGS. 4A-C present various depictions of respective occupant physiology on the placement of a seat belt webbing, in accordance with an embodiment.

FIG. 5 is a schematic illustrating utilization of an adaptive seat belt system with an occupant, according to an embodiment.

DETAILED DESCRIPTION

Figure 1:
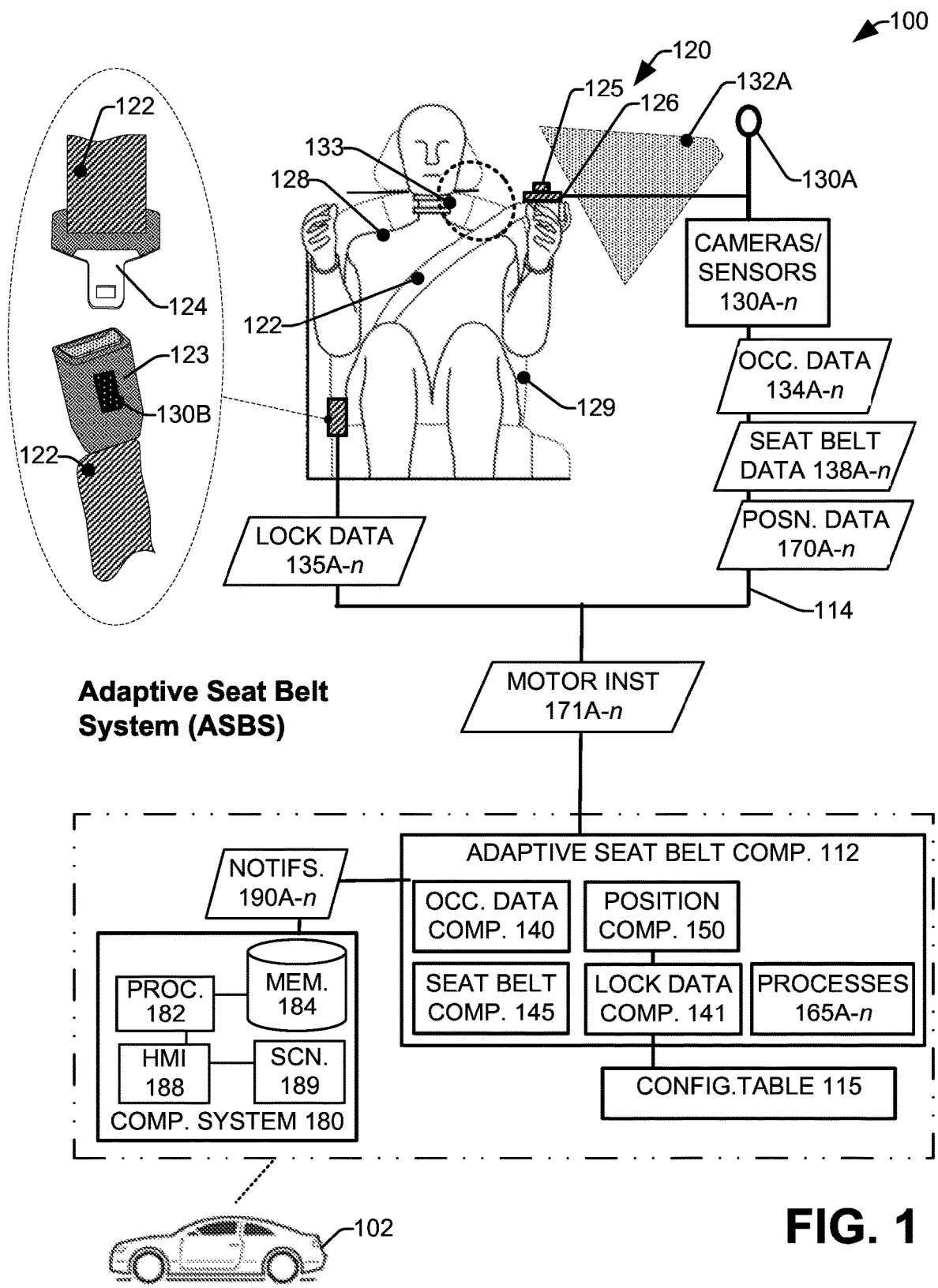
FIG. 1 illustrates an adaptive seat belt system (ASBS) configured to adjust placement of a seat belt webbing as a function of an occupant's physiology, in accordance with at least one embodiment.

The following detailed description is merely illustrative and is not intended to limit embodiments and/or application or uses of embodiments. Furthermore, there is no intention to be bound by any expressed and/or implied information presented in any of the preceding Background section, Summary section, and/or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It is to be understood that when an element is referred to as being "coupled" to another element, it can describe one or more different types of coupling including, but not limited to, chemical coupling, communicative coupling, electrical coupling, electromagnetic coupling, operative coupling, optical coupling, physical coupling, thermal coupling, and/or another type of coupling. Likewise, it is to be understood that when an element is referred to as being "connected" to another element, it can describe one or more different types of connecting including, but not limited to, electrical connecting, electromagnetic connecting, operative connecting, optical connecting, physical connecting, thermal connecting, and/or another type of connecting.

As used herein, "data" can comprise metadata. Further, ranges A-n are utilized herein to indicate a respective plurality of devices, components, signals, datasets, etc., where n is any positive integer.

In the various embodiments presented herein, the disclosed subject matter relates to an adaptive seat belt system configured to automatically adjust placement of a seat belt webbing as a function of the physiology of a person sat in a seat to which the adaptive seat belt system is attached (e.g., to provide restraint during an accident/deceleration). In an embodiment, insertion of a seat belt tongue into a buckle by the seat occupant can be detected which initiates a camera/sensor system to capture information regarding the occupant's physiology.

The seat belt system (e.g., a three-point system comprising a lap belt and a sash belt portion of the seat belt webbing) can be configured with a webbing guide system that adjusts position to optimize a position of the seat belt webbing relative to the occupant, wherein optimization can be a function of occupant safety, occupant comfort, and suchlike. In an embodiment, the webbing guide system can include a webbing guide pin, wherein an edge of the seat belt webbing locates against the pin, and adjustment in position of the pin causes a respective adjustment in the position of the edge of the seat belt webbing relative to an occupant.

It is to be appreciated that the various embodiments presented herein can be implemented automatically by one or more components and/or systems configured to perform the one or more operations, functions, etc., e.g., by one or more components included in the adaptive seat belt system. Automated operations can include, for example, in a non-limiting list: determining presence of an occupant in a vehicle seat; determining physiology, posture, etc., of the occupant; adjusting position of a seat belt webbing in accordance with the occupant's physiology, further monitoring the occupant's physiology/position relative to a current position of the seat belt webbing and further adjusting as required, and the like.

Turning now to the figures, FIG. 1 illustrates an adaptive seat belt system (ASBS) 100 configured to adjust placement of a seat belt webbing as a function of an occupant's physiology, in accordance with at least one embodiment. ASBS 100 can be located onboard a vehicle 102, and can include an adaptive seat belt component (ASBC) 112, wherein the ASBC 112 can be configured to control operation of a seat belt system 120 utilized to restrain an occupant 128 (e.g., during deceleration of the vehicle 102). The seat belt system 120 can be three-point seat belt system comprising: a seat belt webbing 122, a buckle 123, a tongue 124, a seat belt webbing guide/device 125, and a webbing retractor 126. The seat belt webbing 122 can be attached to the vehicle 102 via, for example, anchors (not shown), the retractor 126 and seat belt webbing guide 125 can be incorporated into a seat 129 onboard vehicle 102, and suchlike.

As shown in FIG. 1, the ASBC 112 can be communicatively coupled to various cameras/sensors 130A-n configured to generate and transmit various occupant images/data 134A-n. The cameras/sensors 130A-n can include any suitable detection/measuring device, including cameras, infrared cameras, optical sensors, laser sensors, Light Detection and Ranging (LiDAR) sensors, radar, sonar sensors, audiovisual sensors, perception sensors, motion detectors, velocity sensors, location sensor, a hall element sensor, a spring operated sensor, a force sensor, a proximity sensor, and the like, as employed by applications and computer-based technologies and methods utilized to determine pertinent information regarding operation of the seat belt system 120, physiology of occupant 128, and suchlike. The cameras/sensors 130A-n can be controlled by any of the respective components located onboard vehicle 102. For example, the ASBC 112 can control operation (e.g., on/off, direction/field of view 132, etc.) of the cameras/sensors 130A-n to enable detection and/or physiology of occupant 128, etc.

In an embodiment, the buckle 123 can include a seat belt sensor 130B wherein the seat belt sensor 130B can be configured to detect the seat belt tongue 124 inserted in the buckle 123. The seat belt sensor 130B can be further configured to generate and transmit lock data 135A-n (aka seat belt fasten data) wherein the lock data 135A-n can include information regarding whether the tongue 124 is, or is not, located in the buckle 123. Any suitable sensor technology can be utilized for sensor 130B, e.g., a hall effect sensor, a location sensor, a spring operated sensor, a force sensor, a proximity sensor, and suchlike. The ASBC 112 can include a lock data component 141 configured to receive and process the lock data 135A-n (e.g., to determine when to monitor the occupant 128 and when to terminate monitoring).

In an embodiment, the cameras/sensors 130A-n can be configured to monitor the occupant 128 to capture and generate occupant data 134A-n. The occupant data 134A-n can be utilized to enable determination (e.g., by the ASBC 112) of the physiology of the occupant 128, wherein information of interest regarding the occupant 128, in a non-limiting list, can include the height of the occupant's 128 torso, location of the occupant's 128 shoulder, position/width of the occupant's 128 neck 133, location of occupant 128's sternum, location of occupant's 128s shoulder relative to location of the seat belt retractor 126, location of buckle 123, use of a booster seat (e.g., booster seat 410, per FIG. 4), and suchlike. The cameras/sensors 130A-n can be configured to generate and transmit occupant data 134A-n comprising data/information/images obtained by cameras/sensors 130A-n regarding the occupant 128's physiology, posture, position, and suchlike. In an embodiment, the cameras/sensors 130A-n can be any suitable device/technology to enable occupant data 134A-n to be obtained, wherein the cameras/sensors 130A-n can be located in the passenger compartment (per FIG. 6) of vehicle 102. For example, camera 130A with a field of view 132A directed at the respective seat, e.g., any of seats 129A-n located onboard vehicle 102, in which the occupant 128 may be sitting, in accordance with one or more embodiments presented herein.

Figure 2:
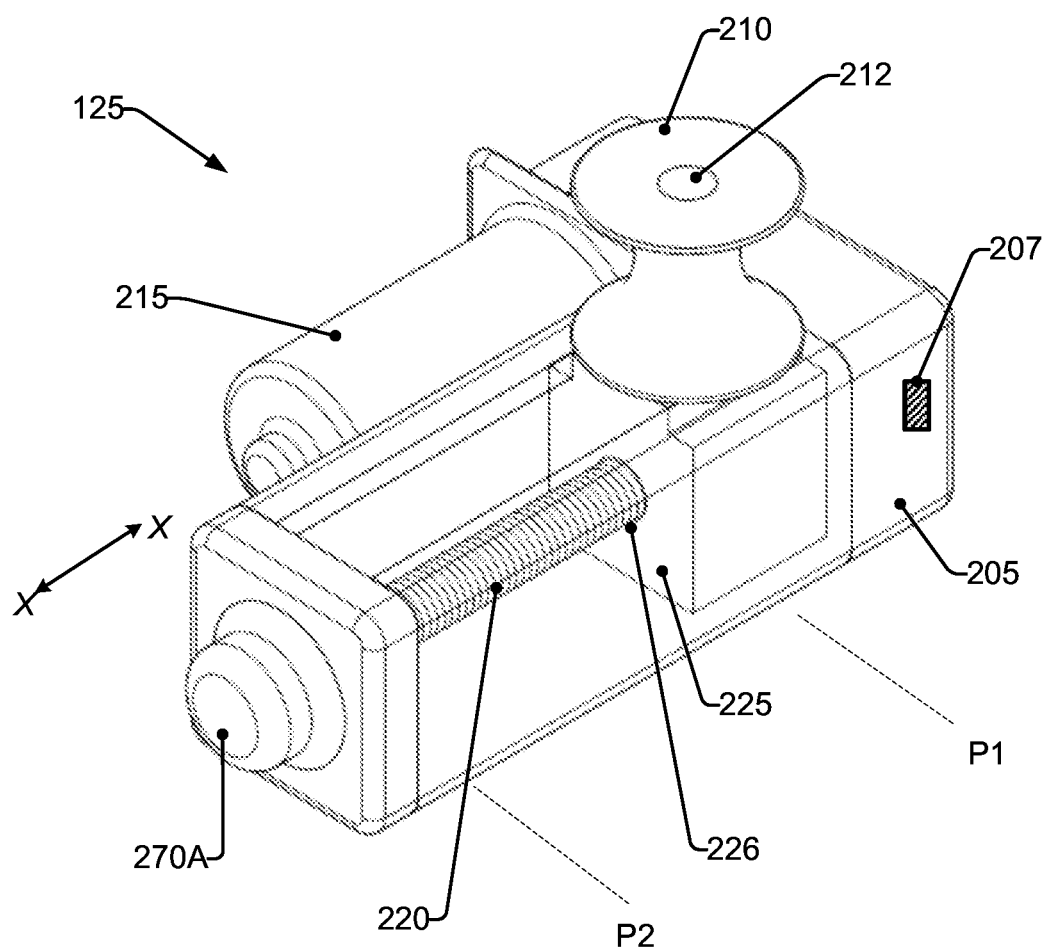
FIG. 2 illustrates a view of a seat belt webbing guide, in accordance with an embodiment.

As further described, the position of seat belt webbing 122 can be controlled by respective placement of a seat belt webbing guide 125. Turning to FIG. 2, system 125 illustrates a seat belt webbing guide/device 125, in accordance with an embodiment. As shown, the seat belt webbing guide 125 includes a seat belt guide 210 comprising a guide pin 210 which is located on a peg 212. As further shown in the cut away portion of FIG. 2 the seat belt webbing guide 125 further comprises a motor 215, wherein the motor 215 can control rotation/operation of a threaded rod 220. The guide pin 210 can be coupled to the threaded rod 220 via a moveable (positionable) block 225 (e.g., a threaded slider), wherein the guide pin 210 is attached to the moveable block 225 via the peg 212. The moveable block 225 includes an internally threaded hole 226 configured to move along the threaded rod 220 in the X-X direction (e.g., during rotation of the threaded rod 220 by motor 215). It is to be appreciated that while FIG. 2 presents moveable block 225 being positioned based on a motor 215 coupled to the threaded rod 220, any suitable technology can be utilized by motor 215 to position moveable block 225, e.g., a dc motor, a linear actuator, a screw drive, screw driven linear actuator, a stepper motor, and suchlike. The motor 215, threaded rod 220, and moveable block 225 can be combined in a housing 205. In the example embodiment presented in FIG. 2 (and FIGS. 3A-C), the threaded rod 220 can be supported between two end supports 270A and 270B incorporated in the housing 205, with guide pin 210 located over the threaded rod 220 such that rotation of the threaded rod 220 causes the movable block 225 to move along the threaded rod 220 between the supports 270A and 270B in direction X-X. As shown, motor 215 can be located in housing 205 to be adjacent to the threaded rod 220 and coupled to the threaded rod 220 by any suitable means to rotate threaded rod 220 (e.g., a gearbox, gears, not shown). In another embodiment, the motor 215 can be positioned at an end of the threaded rod 220 such that operation (e.g., rotation) of motor 215 directly rotates the threaded rod 220.

When the seat belt is undone, e.g., tongue 124 is removed from buckle 123, the motor 215 can operate to return the guide pin 210 to an initial position PI, as shown in FIG. 2. In an embodiment, the position of guide pin 210 and the respective position of the webbing 122 when the guide pin 210 is in the initial position PI, the position of the webbing 122 can be such that the webbing 122 does not interfere (e.g., does not get pinched) with positioning of the seat 129 to which the seat belt webbing guide 125 is located, e.g., when a seat 129 can be lowered to create a cargo bay area at the rear of the vehicle 102.

In an embodiment, the seat belt webbing guide 125 can further include a position sensor 207 configured to generate and transmit position data 170A-n regarding a current position of the moveable block 225, wherein the position data 170A-n can be received and processed by the position component 150. Based on knowledge of the current position of the moveable block 225, the position of guide pin 210 can be determined and further controlled by a position component 150 included in the ASBC 112.

Turning to FIG. 1, the ASBC 112 can include an occupant data component 140. The occupant data component 140 can be configured to receive and process (e.g., in conjunction with processes 165A-n) the occupant data 134A-n from the cameras/sensors 130A-n. In another embodiment, the ASBC 112 can also include a seat belt component 145. The seat belt component 145 can be configured to receive and process (e.g., in conjunction with processes 165A-n) the seat belt data 138A-n from the cameras/sensors 130A-n. In an embodiment, the occupant data 134A-n and/or seat belt data 138A-n can include digital images, etc., wherein the ASBC 112 (e.g., occupant data component 140 and/or seat belt component 145 in conjunction with processes 165A-n) can be configured to analyze the digital images, etc., to determine any of the occupant 128's physiology, location of seat belt webbing 122 relative to one or more features of the occupant 128 (e.g., neck 133, shoulder), and suchlike (as further described).

The position component 150, included in ASBC 112, can be configured to control operation of the motor 215 and the movable block 225. In an embodiment, the position component 150 can be communicatively coupled to the motor 215. The position component 150 can be configured to generate and transmit motor instructions 171A-n to motor 215, wherein the motor instructions 171A-n can be configured to control operation of the motor 215, with motor 215 being configured to receive/process the motor instructions 171A-n and further adjust the respective position of the moveable block 225 accordingly.

The position component 150 can be configured to compare seat belt data 138A-n and occupant data 134A-n with one or more defined configurations (e.g., predefined configuration data) included in the configuration table 115, as further described. Configuration table 115 can comprise/be populated with values correlating width W between the edge 121 of the seat belt webbing 122 and the neck 133 of the occupant 128, height (e.g., H1, H2, H3) of occupant 128's shoulder relative to the position of the guide 210, and suchlike. As mentioned, as the position of the seat belt webbing guide 125 can be adjusted so as to maintain an approximate width W, a relation between the webbing 122 and the physiology of occupant 128, and suchlike.

As shown in FIG. 1, the ASBS 100 can further include an onboard computing system (OCS) 180, wherein the OCS 180 can be a vehicle control unit (VCU), an electronic control unit (ECU), an electronic control module, and suchlike. The OCS 180 can be utilized to provide overall operational control and/or operation of vehicle 102, e.g., via vehicle component 160.

As shown in FIG. 1, the OCS 180 can further include a processor 182 and a memory 184, wherein the processor 182 can execute the various computer-executable components, functions, operations, etc., presented herein. The memory 184 can be utilized to store the various computer-executable components, functions, code, etc., as well as occupant data 134A-n, seat belt data 138A-n, lock data 135A-n, position data 170A-n, motor instructions 171A-n, data respectively stored/populating configuration table 115 (e.g., occupant data 534A-n, seat belt data 538A-n), and suchlike.

As further shown, the OCS 180 can include a human-machine interface (HMI) 188 (e.g., a display, a graphical-user interface (GUI)) which can be configured to present various notifications 190A-n (e.g., generated by the ABSC 112) regarding respective positions of seat belt webbing guide 125 relative to occupant 128, per the various embodiments presented herein. The HMI 188 can include an interactive display/screen 189 to present the various information via various screens presented thereon, and further configured to facilitate input of information/settings/etc., regarding operation of the vehicle 102. In an embodiment, the ASBC 112 can generate and transmit a notification 190A-n for presentation of the display 189 regarding placement of the webbing 122 by the guide 210.

The various components located onboard vehicle 102 (e.g., ASBS 100, ASBC 112, cameras/sensors 130A-n, seat belt guide 125, OCS 180, and suchlike) can be communicatively coupled via an onboard computer network/communication bus 114. Network/bus 114 can be any suitable vehicle-borne, embedded system, for example, FLEXRAY, Controller Area Network (CAN), Ethernet, Local Interconnect Network (LIN), and suchlike.

As mentioned, review/comparison of occupant data 134A-n, seat belt data 138A-n, lock data 135A-n, position data 170A-n, and suchlike can be performed by the position component 150 in conjunction with processes 165A-n, wherein processes 165A-n can be processes, operations, functions, workflows, algorithms, etc. Processes 165A-n can include a computer vision process(es), a digital imagery algorithm(s), analysis of occupant 128's posture/physiology, etc., respective position of webbing 122, seat belt webbing guide 125, and suchlike, to enable the respective determinations, predictions, etc., per the various embodiments presented herein.

Figure 3A:
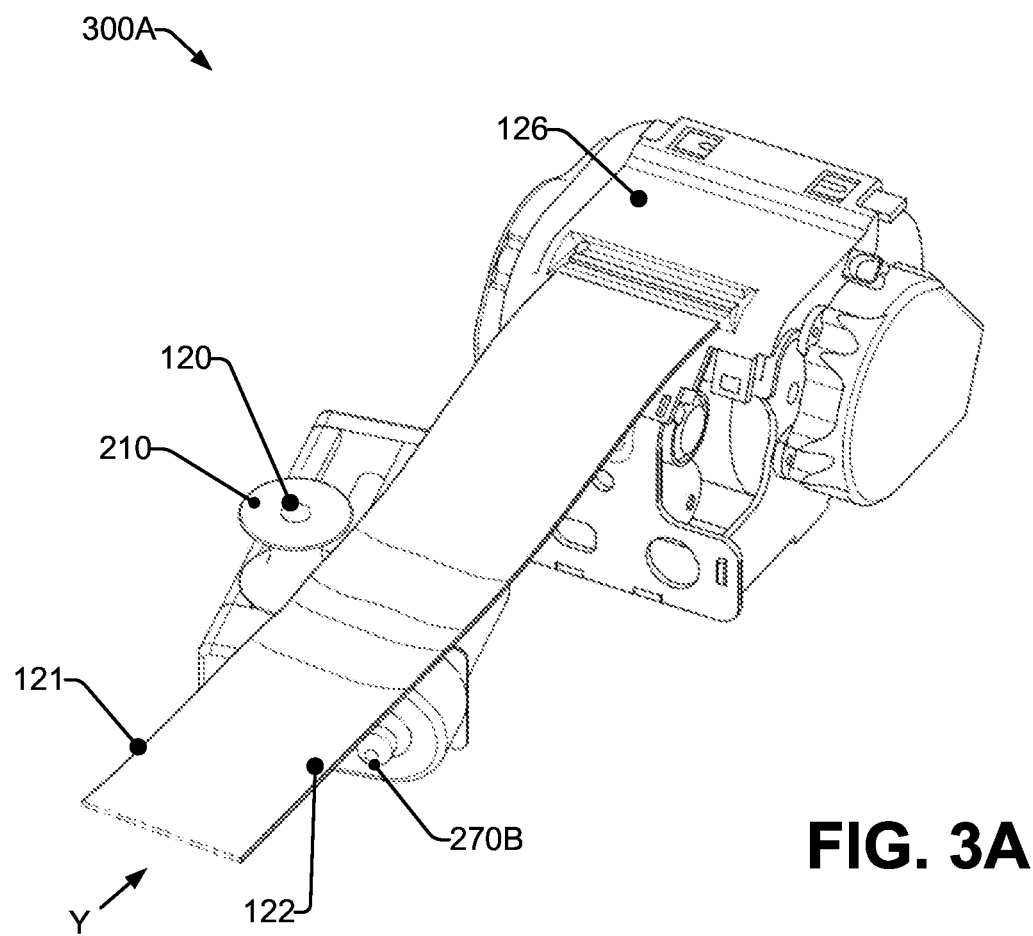

FIGS. 3A-C, systems 300A-C, illustrate various configurations for automatically controlling placement of a seat belt webbing relative to a vehicle occupant, in accordance with an embodiment. As shown in FIGS. 3A-C, a seat belt webbing retractor 126 can be positionally aligned (e.g., along alignment Y) with a seat belt webbing guide 125, such that a seat belt webbing 122 can be withdrawn from/retracted into the retractor 126 wherein an edge 121 of the seat belt webbing 122 abuts the guide pin 210. Hence, as shown in FIGS. 3B and 3C, placement of the guide pin 210 against the webbing edge 121 can cause the alignment of the webbing 122 to be altered/deflected.

In an initial configuration, as depicted in FIG. 3B, the guide pin 210 can be positioned (e.g., at position X1) such that the guide pin 210 is causing minimal or no deflection of the webbing 122 relative to a direction in which the webbing 122 is being withdrawn from the retractor 126. However, as shown in FIG. 3C, as the guide pin 210 is moved in direction X from X1 to X2, the ingress of the guide pin 210 upon the webbing 122 causes the webbing 122 to be deflected from alignment Y1 to alignment Y2. Hence, the respective position of the webbing 122/webbing edge 121 can be changed relative to the position of occupant 128. It is to be appreciated that while FIGS. 3A-C illustrate a guide 210 moving left from position Y1 to Y2, the configurations presented in FIG. 3A-C can be reversed to facilitate placement and operation of the seat belt webbing guide 125 on various seats 129A-n on a vehicle, e.g., driver's side seats and passenger side seats. Upon termination of operation/control of the seat belt webbing guide 125, the guide pin 210 can be re-positioned in the initial position X1.

Turning momentarily to FIGS. 4A-C, systems 400A-C are presented for understanding regarding the effect of respective occupant physiology on the placement of a seat belt webbing, in accordance with an embodiment. FIG. 4A represents an occupant 128A having a 50% male physiology (e.g., represented as a crash test dummy "50$^{th}$ percentile male"), FIG. 4B represents an occupant 128B having a 5% average female physiology 128B (e.g., represented as a crash test dummy "5$^{th}$ percentile female"), and FIG. 4C represents an occupant 128C having a physiology of a ~10 year old child (e.g., represented as a crash test dummy "50$^{th}$ percentile child ~10 years old"). As shown with FIG. 4A, the webbing 122 is located at the shoulder (e.g., distance H1) with reasonable distance between the edge 121 of the webbing 122 and the neck 133 of occupant 128A. Per FIG. 4B, the webbing 122 is located above the shoulder (e.g., distance H2<H1) with the edge 121 of the webbing 122 being proximate to the neck 133 and sternum of occupant 128B. In an embodiment, this configuration can cause the webbing edge 121 to rub against the neck 133 of an occupant 138 having this physiology, which can be uncomfortable. Per FIG. 4C, the webbing 122 is positioned such that a possibility exists that the occupant 128C positioned on the booster seat 410 is liable to slide out from under the webbing 122 in the event of vehicle 102 decelerating rapidly (e.g., a result of an accident). Further, the height H3 can be of interest when positioning webbing 122 to facilitate restraint of the occupant 128C. Accordingly, by utilizing a fixed, conventional approach of one-size fits all configuration, issues arise as the occupant 128's physiology departs from that of the 50% M presented in FIG. 4A.

FIG. 5, schematic 500, illustrates utilizing an adaptive seat belt system with an occupant. As shown, an occupant 128 is located in a seat 129, whereby the occupant 128 is sitting with a seat webbing 122 deployed. An edge 121 of the webbing 122 is located at distance W from a first side of the occupant 128's neck 133. As shown, as the position of the seat belt guide pin 210 is adjusted in the X-X direction, there is a corresponding reduction/increase in the width W between the first side of the occupant 128's neck 133. The distance W can be controlled by the ASBC 112 based on any of the occupant data 134A-n, the seat belt data 138A-n, the position data 170A-n, and suchlike. As shown in FIG. 5, in an embodiment, the retractor 126 and the seat belt webbing guide 125 can be incorporated into a seat 129 (e.g., into the top surface 129A of a seat 129) such that the guide 210 protrudes above the top surface of the seat to enable positional control of the webbing 122, and webbing 122 can be retracted/withdrawn from the retractor 126.

Figure 6:
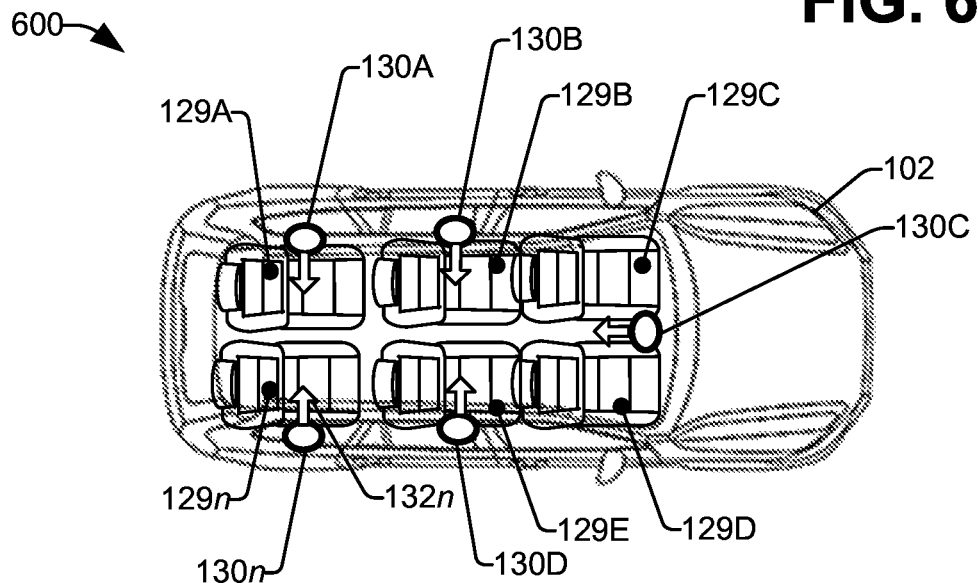
FIG. 6 is an image illustrating a vehicle with internal sensors configured to capture data regarding one or more occupants and/or seats in the vehicle, according to an embodiment.

FIG. 6, image 600 illustrates a vehicle with internal sensors configured to capture data regarding one or more occupants and/or seats in the vehicle, according to an embodiment. As shown, example vehicle 102 has six seats 129A-n located in the passenger compartment, with various cameras/sensors 130A-n configured to capture occupant data 134A-n for each occupant 128A-n that may sit in vehicle 102, wherein the respective cameras/sensors 130A-n can be aligned such that the respective occupant 128A-n and/or seat 129A-n is in the field of view 132A-n (as indicated by the arrows).

Figure 7:
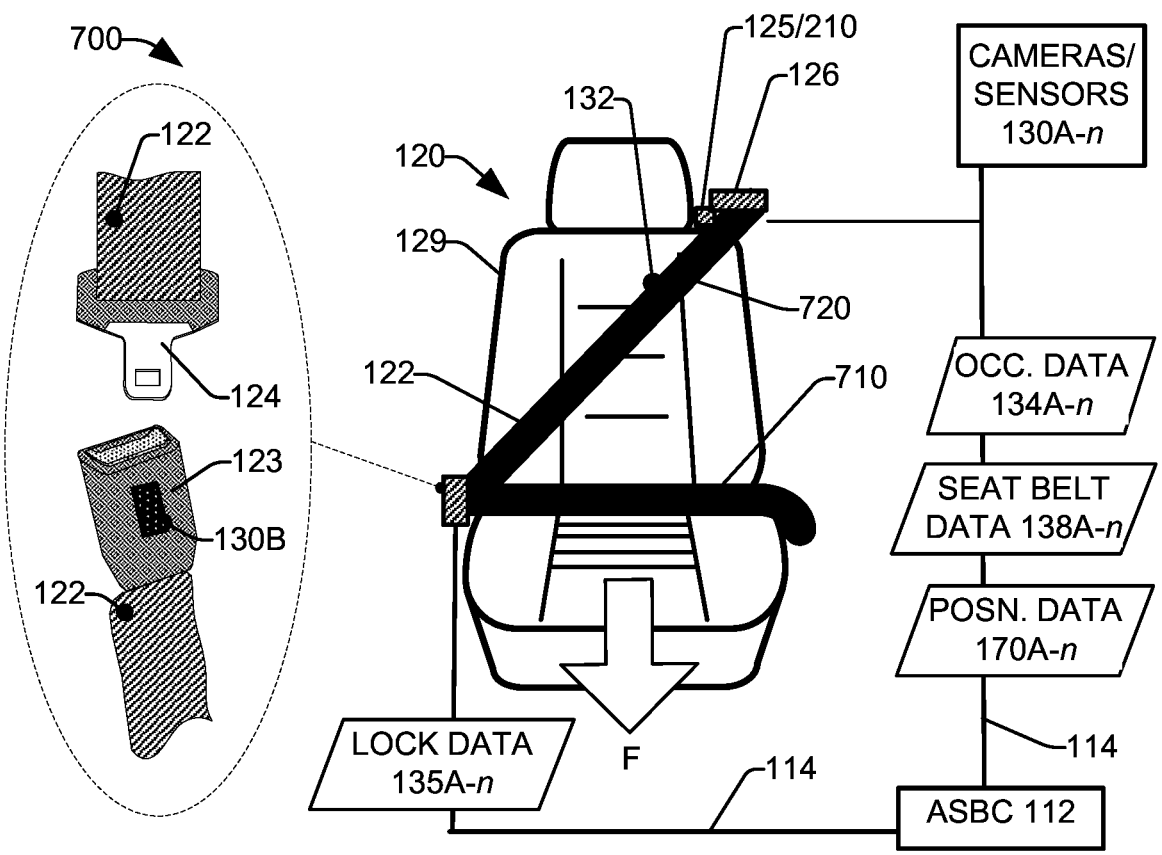
FIG. 7, is an image illustrating a seat and seat belt with a direction F of motion of an occupant during a deceleration (e.g., rapid deceleration) of a vehicle that includes the seat, in accordance with an embodiment.

FIG. 7, image 700 illustrates a seat and seat belt with a direction F of motion of an occupant during a deceleration (e.g., rapid deceleration) of a vehicle that includes the seat, in accordance with an embodiment. A three-point seat belt system is presented comprising a webbing 122 with a lap belt portion 710 and a sash/diagonal portion 720, with a seat belt 122 utilized to secure/constrain an occupant 128 in the seat 129. The three-point configuration can further comprise the tongue 124 being located in the buckle 123, with insertion/removal of the tongue 124 being detected by the sensor 130B incorporated into the buckle 123. As shown, during deceleration of a vehicle (e.g., vehicle 102) momentum can cause an occupant 128 to move in direction F, with the seat belt system 120 operating to restrain the occupant 128. ASBC 112 can be communicatively coupled to various intelligent sensors 130A-n configured to generate and transmit information such as occupant data 134A-n, seat belt data 138A-n, guide position data 170A-n, and suchlike. The ASBC 112 can be configured to receive the occupant data 134A-n, seat belt data 138A-n, guide position data 170A-n, and suchlike, and based thereon, generate and transmit motor instructions 171A-n to control placement/operation of the seat belt 122 in accordance with the safety, comfort, and suchlike of the occupant 128.

Figure 8:
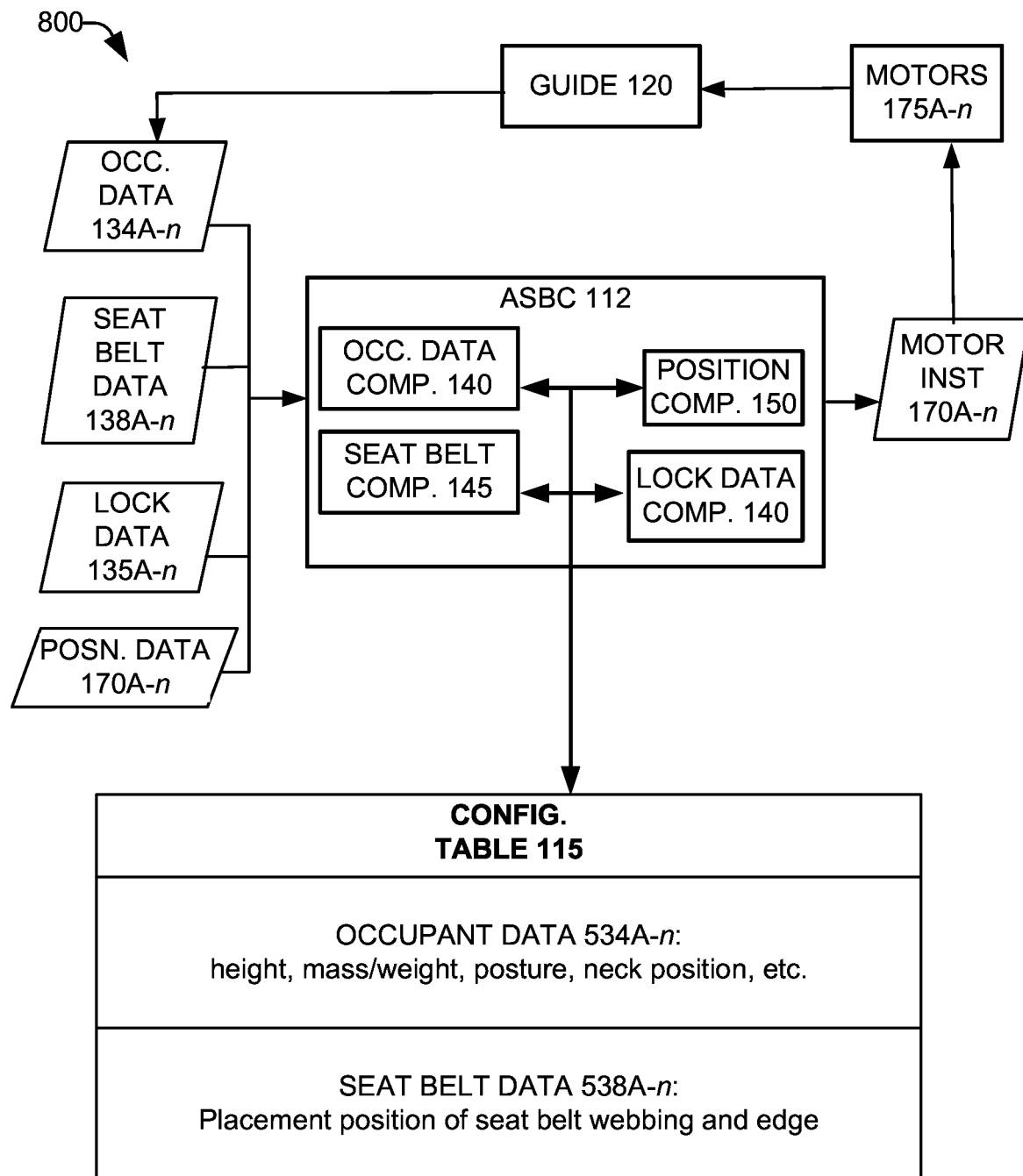
FIG. 8 presents a system illustrating a configuration of adaptive seat belt system depicting components, sensors, data, etc., that can be utilized during positioning of a seat belt webbing, in accordance with an embodiment.

As previously mentioned, in an embodiment, the position component 150 can be configured to reference configuration table 115 to assist in determining positional placement of the guide 210. For example, the configuration table 115 can be pre-populated/preconfigured with various physiologies relating to the respective physiology of an occupant 128A-n located in seat 129A-n. For example, configuration table 115 can be pre-populated with height data, weight data, chest data, etc., pertaining to a range of human physiologies (e.g., as utilized by engineers to design/manufacture crash test dummies). FIG. 8, system 800 presents a configuration of ASBS 100 illustrating components, sensors, data, etc., that can be utilized during positioning of a seat belt webbing, in accordance with an embodiment. As shown, the ASBC 112 can receive any of occupant data 134A-n, lock data 135A-n, seat belt data 138A-n, etc., and respectively received and/or processed by the occupant data component 140, the lock data component 141, the seat belt component 145, the position component 150, etc. The position component 150 can be further configured, based on occupant data 134A-n, lock data 135A-n, seat belt data 138A-n, position data 170A-n, to determine/generate/transmit motor instructions 171A-n, (e.g., via bus 114) to control placement of the moveable block 225 and the guide pin 210 attached thereto. The motor instructions 171A-n can be transmitted to the motor 215 to control positioning of the guide 210. In an embodiment, positioning of the guide pin 210 can be performed with real time feedback, wherein the ASBC 112 can be configured to analyze positioning information included in any of occupant data 134A-n, lock data 135A-n, seat belt data 138A-n, position data 170A-n, etc., and adjust position of the guide pin 210 (e.g., via motor instructions 171A-n) to maintain the position of the guide pin 210 relative to the position of the occupant 128. For example, the position of the guide pin 210 can be positioned in real time such that a distance W between the edge of the webbing 121 is maintained to a desired value.

Further, the data 134A-n, 138A-n, and/or 170A-n can be reviewed by the position component 150 in conjunction with information prepopulating configuration table 115. For example, data 134A-n, 138A-n, and/or 170A-n can include such values as occupant 128's approximate height, shoulder position, neck position, as well as position of the seat belt 122. Upon receipt of the values in data 134A-n, 138A-n, and/or 170A-n, the position component 150 can correlate the values to the values for occupant data 534A-n, seat belt data 538A-n, etc., prepopulating configuration table 115. The values for occupant data 534A-n and/or seat belt data 538A-n in configuration table 115 may be able to be utilized by the position component 150 to generally determine placement of the seat belt webbing 122, and based thereon, generate and transmit motor instructions 171A-n to enable the seat belt webbing 122 to be approximately placed. Once the seat belt webbing 122 is placed in accordance with the values for data 534A-n and/or 538A-n, a real time positioning approach can be subsequently utilized to fine tune position of the seat belt webbing 122.

Figure 9:
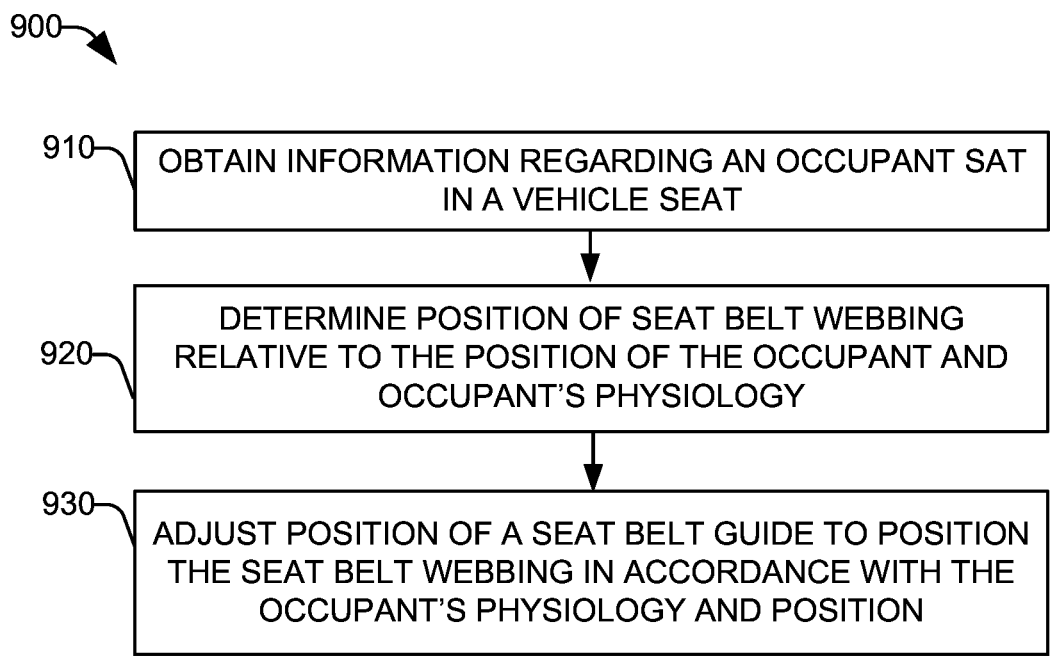
FIG. 9 illustrates a flow diagram for a computer-implemented methodology to automatically position a seat belt webbing to improve safety and/or comfort of utilizing a seat belt system, in accordance with at least one embodiment.

FIG. 9 illustrates a flow diagram 900 for a computer-implemented methodology to automatically position a seat belt webbing to improve safety and/or comfort of utilizing a seat belt system, in accordance with at least one embodiment.

At 910, data/information (e.g., occupant data 134A-n) regarding an occupant (e.g., occupant 128) located in a vehicle seat (e.g., seat 129 on vehicle 102) can be obtained, e.g., by various cameras, sensors, and suchlike (e.g., cameras/sensors 130A-n). As previously mentioned, the occupant data can include information regarding the occupant's physiology, height, shoulder position, neck position, weight/mass, and suchlike.

At 920, position of the seat belt webbing (e.g., webbing 122) relative to the occupant can be determined. In an embodiment, seat belt data (e.g., seat belt data 138A-n) can be reviewed, e.g., regarding a position of an edge (e.g., edge 121) of the seat belt webbing relative to the occupant's neck (e.g., neck 133) to reduce, for example, occupant's annoyance with how the seat belt is positioned as a function of their physique. In another embodiment, the position of the seat belt webbing can be reviewed with regard to the ability of the seat belt webbing to restrain the occupant during an accident/deceleration, e.g., adjust position of seat belt webbing to improve operation of the seat belt during an accident where the occupant has a physique smaller than that of an average male.

At 930, the position of the seat belt webbing can be adjusted in accordance with the comfort, safety, and suchlike, of the occupant. As previously described, position of a seat belt webbing guide (e.g., webbing guide pin 210) can be adjusted (e.g., by position component 150 controlling operation of motor 215 and moveable block 225 via motor instructions 171A-n) such that the position of the seat belt webbing is changed in accordance with the occupant's physique, e.g., relative to the occupant's shoulder, neck position, etc. The operations presented in 910-930 can be continuously performed during utilization of the seat belt by the occupant.

Figure 10:
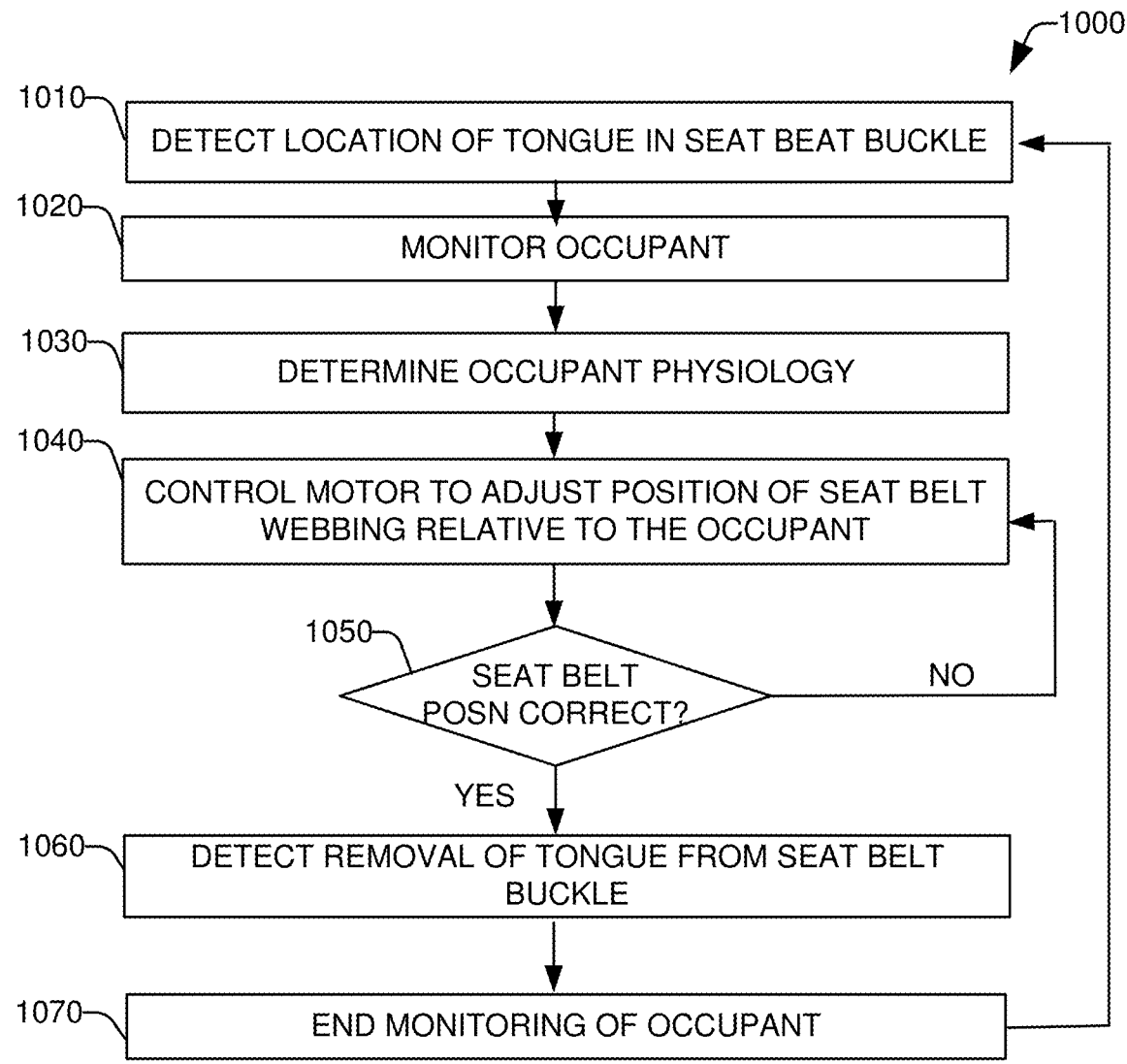
FIG. 10 illustrates a flow diagram for a computer-implemented methodology to automatically adjust placement of a seat belt webbing as a function of an occupant's physiology, in accordance with at least one embodiment.

FIG. 10 illustrates a flow diagram 1000 for a computer-implemented methodology to automatically adjust placement of a seat belt webbing as a function of an occupant's physiology, in accordance with at least one embodiment.

At 1010, engagement of a tongue (e.g., tongue 124) in a buckle (e.g., buckle 123) can be detected by a lock sensor (e.g., by sensor 130B) indicating that an occupant (e.g., occupant 128) is utilizing a seat belt (e.g., seat belt system 120) on a vehicle (e.g., vehicle 102). In an embodiment, the occupant is sat in a seat (e.g., seat 129) for which the seat belt system is configured to restrain the occupant in the event of an accident/deceleration. The lock sensor can be configured to generate and transmit lock data (e.g., lock data 135A-n) to an adaptive seat belt system (e.g., ASBS 100) comprising an adaptive seat belt component (e.g., ASBC 112). The ASBC can include a lock component (e.g., lock data component 141) configured to receive and process the lock data, and in response to determining the lock data indicates the seat belt is being utilized, the ASBC can be further configured to monitor the occupant and the seat belt position.

At 1020, the occupant can be monitored by various cameras/sensors (e.g., by cameras/sensors 130A-n) such that data (e.g., occupant data 134A-n) can be obtained regarding the occupant's physiology. The occupant data can be generated and transmitted from the various cameras/sensors via a communication bus (e.g., bus 114) to other components communicatively coupled to the cameras/sensors.

At 1030, the occupant data can be received at the ASBC. The ASBC can be configured to receive the occupant data and further process the occupant data to determine one or more aspects of the physiology of the occupant (e.g., height, weight, etc.).

At 1040, the position of the seat belt webbing can be adjusted in accordance with the occupant's physiology. Webbing from a seat belt retractor can be positioned against a webbing guide pin (e.g., guide pin 210) wherein, when the webbing is connected by the tongue into the buckle, the webbing forms a sash across the occupant's torso. The webbing guide pin can be positioned by a motor (e.g., motor 215) wherein the ASBC can generate and transmit (e.g., by position component 150) instructions (e.g., motor instructions 171A-n) to the motor, wherein the instructions can control the motor to further control the location of the webbing guide pin.

At 1050, further seat belt data (e.g., seat belt data 138A-n) can be generated (e.g., by the cameras/sensors 130A-n) and transmitted to the ASBC (e.g., the seat belt component 145) wherein the ASBC can review the seat belt data to determine whether the seat belt position is correct in view of the occupant's physiology. At 1050, in response to a determination (e.g., by the ASBC) that NO, the seat belt is not in the correct position, methodology 1000 can return to 1040 for further positioning of the webbing guide to be performed, as previously described.

At 1050, in response to a determination (e.g., by the ASBC) that YES, the seat belt webbing is currently in the correct position with regard to the occupant's physiology, methodology 1000 can advance to 1060, wherein the methodology 1000 can repeat 1020 to 1050 while the occupant is located in the seat and using the seat belt. Further, subsequently received lock data can be received, wherein the removal of the tongue from the buckle can be detected by the lock component, whereupon the lock component can generate and transmit a seat belt unfastened notification.

At 1070, in response to the seat belt unfastened notification being generated, the ASBC can be configured to cease monitoring of the occupant by the various cameras and sensors. Methodology 1000 can return to 1010, wherein the ASBC can await a subsequent indication in the lock data that the seat belt is being fastened, and monitoring of the occupant is re-performed with accompanying placement of the seat belt webbing. The webbing guide pin can return to an original position (e.g., position X1).

Example Operating Environment and Scenarios

Figure 11:
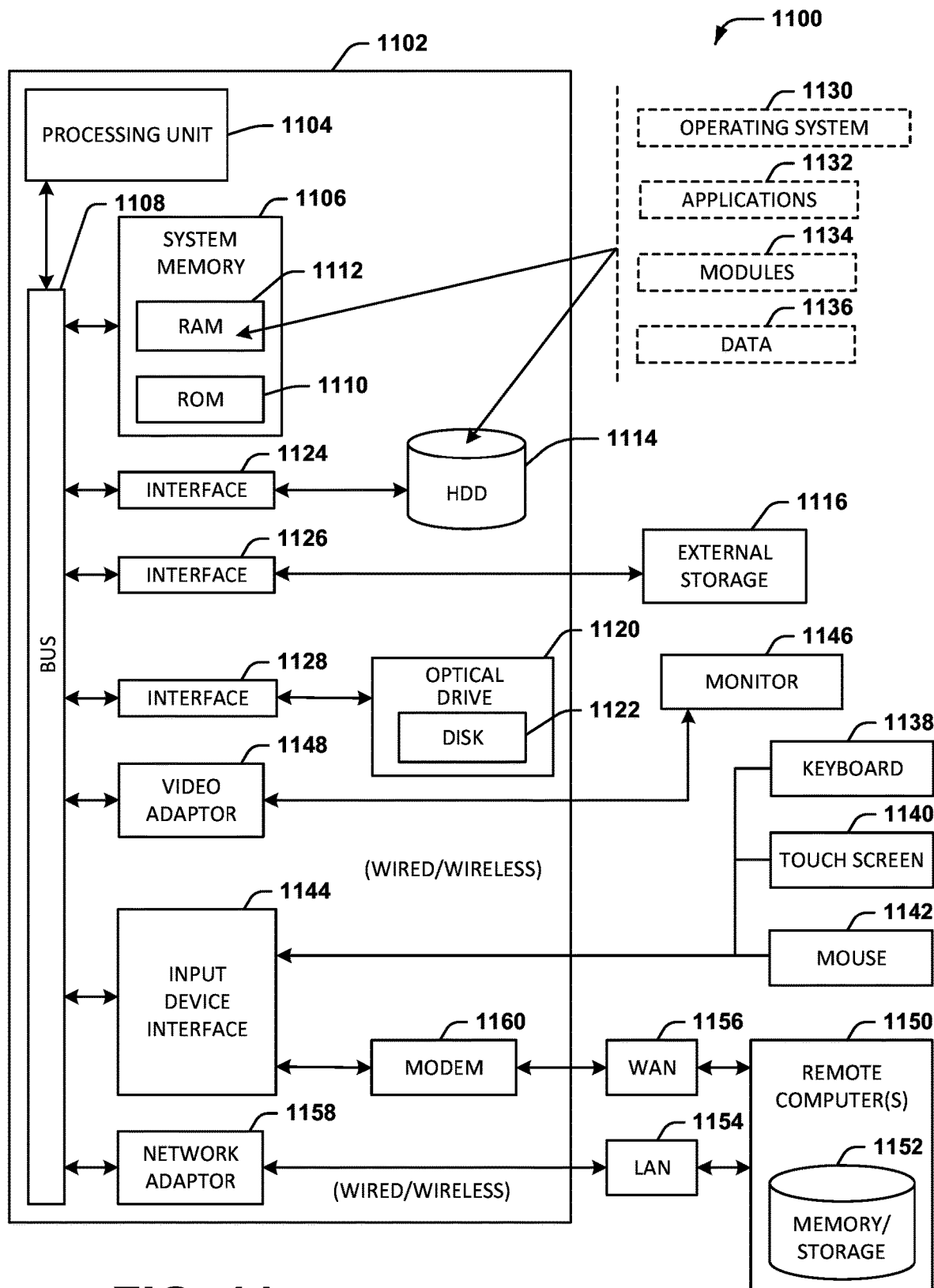
FIG. 11 is a block diagram illustrating an example computing environment in which the various embodiments described herein can be implemented.

Turning next to FIGS. 11 and 10, a detailed description is provided of additional context for the one or more embodiments described herein with FIGS. 1-10.

In order to provide additional context for various embodiments described herein, FIG. 11 and the following discussion are intended to provide a brief, general description of a suitable computing environment 1100 in which the various embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infra-red and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors and may include a cache memory. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid-state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1094 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can comprise a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infra-red (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1094 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

Figure 12:
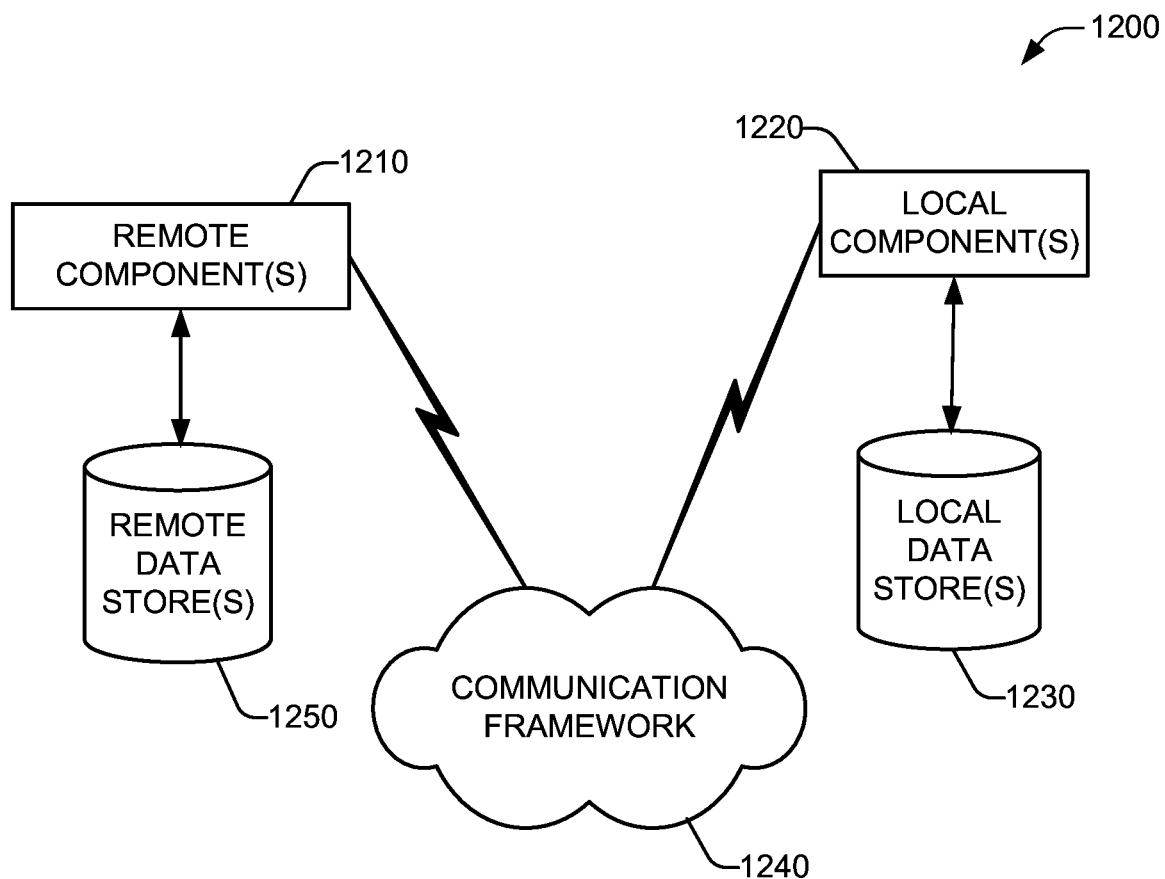
FIG. 12 is a block diagram illustrating an example computing environment with which the disclosed subject matter can interact, in accordance with an embodiment.

Referring now to details of one or more elements illustrated at FIG. 12, an illustrative cloud computing environment 1200 is depicted. FIG. 12 is a schematic block diagram of a computing environment 1200 with which the disclosed subject matter can interact. The system 1200 comprises one or more remote component(s) 1210. The remote component(s) 1210 can be hardware and/or software (e.g., threads, processes, computing devices). In some embodiments, remote component(s) 1210 can be a distributed computer system, connected to a local automatic scaling component and/or programs that use the resources of a distributed computer system, via communication framework 1240. Communication framework 1240 can comprise wired network devices, wireless network devices, mobile devices, wearable devices, radio access network devices, gateway devices, femtocell devices, servers, etc.

The system 1200 also comprises one or more local component(s) 1220. The local component(s) 1220 can be hardware and/or software (e.g., threads, processes, computing devices). In some embodiments, local component(s) 1220 can comprise an automatic scaling component and/or programs that communicate/use the remote resources 1210 and 1220, etc., connected to a remotely located distributed computing system via communication framework 1240.

One possible communication between a remote component(s) 1210 and a local component(s) 1220 can be in the form of a data packet adapted to be transmitted between two or more computer processes. Another possible communication between a remote component(s) 1210 and a local component(s) 1220 can be in the form of circuit-switched data adapted to be transmitted between two or more computer processes in radio time slots. The system 1200 comprises a communication framework 1240 that can be employed to facilitate communications between the remote component(s) 1210 and the local component(s) 1220, and can comprise an air interface, e.g., Uu interface of a UMTS network, via a long-term evolution (LTE) network, etc. Remote component(s) 1210 can be operably connected to one or more remote data store(s) 1250, such as a hard drive, solid state drive, SIM card, device memory, etc., that can be employed to store information on the remote component(s) 1210 side of communication framework 1240. Similarly, local component(s) 1220 can be operably connected to one or more local data store(s) 1230, that can be employed to store information on the local component(s) 1220 side of communication framework 1240.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," "BS transceiver," "BS device," "cell site," "cell site device," "gNode B (gNB)," "evolved Node B (eNode B, eNB)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "client entity," "consumer," "client entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

It should be noted that although various aspects and embodiments are described herein in the context of 5G or other next generation networks, the disclosed aspects are not limited to a 5G implementation, and can be applied in other network next generation implementations, such as sixth generation (6G), or other wireless systems. In this regard, aspects or features of the disclosed embodiments can be exploited in substantially any wireless communication technology. Such wireless communication technologies can include universal mobile telecommunications system (UMTS), global system for mobile communication (GSM), code division multiple access (CDMA), wideband CDMA (WCMDA), CDMA2000, time division multiple access (TDMA), frequency division multiple access (FDMA), multi-carrier CDMA (MC-CDMA), single-carrier CDMA (SC-CDMA), single-carrier FDMA (SC-FDMA), orthogonal frequency division multiplexing (OFDM), discrete Fourier transform spread OFDM (DFT-spread OFDM), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM (CP-OFDM), resource-block-filtered OFDM, wireless fidelity (Wi-Fi), worldwide interoperability for microwave access (WiMAX), wireless local area network (WLAN), general packet radio service (GPRS), enhanced GPRS, third generation partnership project (3GPP), long term evolution (LTE), 5G, third generation partnership project 2 (3GPP2), ultra-mobile broadband (UMB), high speed packet access (HSPA), evolved high speed packet access (HSPA+), high-speed downlink packet access (HSDPA), high-speed uplink packet access (HSUPA), Zigbee, or another institute of electrical and electronics engineers (IEEE) 802.12 technology.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Various non-limiting aspects of various embodiments described herein are presented in the following clauses:

Clause 1: A system, located onboard a vehicle, comprising: a memory that stores computer executable components, and a processor that executes the computer executable components stored in the memory, wherein the computer executable components comprise an adaptive seat belt component (ASBC) configured to: determine physiology of an occupant located in a seat onboard the vehicle, determine a position of a seat belt webbing in accordance with the occupant's physiology, and adjust position of the seat belt webbing in accordance with the occupant's physiology.

Clause 2: The system of any preceding clause, wherein the ASBC is further configured to: receive, from a first sensor, occupant data regarding the physiology of the occupant, based on the occupant data, generate a position instruction to adjust the position of the seat belt webbing in accordance with the occupant's physiology, and transmit the position instruction to a device, wherein the device is configured to adjust the position of the seat belt webbing in response to the position instruction.

Clause 3: The system of any preceding clause, wherein the first sensor is a camera or a radar device.

Clause 4: The system of any preceding clause, receive, from a second sensor, seat belt data regarding a position of an edge of the seat belt webbing relative to the occupant's body, wherein the position instruction is configured to place the edge of the seat belt webbing at a defined distance between the occupant's neck and the edge of the seat belt webbing.

Clause 5: The system of any preceding clause, wherein the device includes a webbing guide component comprising a pin, wherein the edge of the seat belt webbing locates against the pin, and adjustment in position of the pin causes a respective adjustment in the position of the edge of the seat belt webbing relative to the occupant's neck.

Clause 6: The system of any preceding clause, wherein the ASBC is further configured to receive seat belt fasten data, the seat belt fasten data indicates whether a tongue located on the seat belt is inserted in a buckle utilized to secure the seat belt, wherein the seat belt fasten data is received from a second sensor located in the seat belt buckle.

Clause 7: The system of any preceding clause, wherein the ASBC is further configured to in response to a determination that the seat belt fasten data indicates the tongue is released from the seat buckle, transmit a second position signal to the device, wherein the second position instructs the device to return to an initial position, wherein the initial position places the seat belt webbing in a position to enable the car seat to be lowered.

Clause 8: The system of any preceding clause, wherein the ASBC is further configured to in response to a determination that the seat belt fasten data indicates the tongue is released from the seat buckle, cease at least one of determining physiology of the occupant or positioning of the seat belt webbing.

Clause 9: The system of any preceding clause, wherein the seat belt is a three-point seat belt system.

Clause 10: A computer-implemented method comprising: determining, by a device comprising a processor located on a vehicle, physiology of an occupant located in a seat onboard the vehicle, determining, by the device, a position of a seat belt webbing in accordance with the occupant's physiology, and adjusting, by the device, position of the seat belt webbing in accordance with the occupant's physiology.

Clause 11: The computer-implemented method of any preceding clause, further comprising: receiving, at the device from a first sensor, occupant data regarding the physiology of the occupant, based on the occupant data, generating, by the device, a position instruction to adjust the position of the seat belt webbing in accordance with the occupant's physiology, and transmitting, by the device, the position instruction to a webbing guide device, wherein the webbing guide device is configured to adjust the position of the seat belt webbing in response to the position instruction.

Clause 12: The computer-implemented method of any preceding clause, wherein the wherein the first sensor is a camera or a radar device.

Clause 13: The computer-implemented method of any preceding clause, further comprising: receiving, at the device from a second sensor, seat belt data regarding a position of an edge of the seat belt webbing relative to the occupant's body, wherein the position instruction is configured to place the edge of the seat belt webbing at a defined distance between the occupant's neck and the edge of the seat belt webbing.

Clause 14: The computer-implemented method of any preceding clause, wherein the webbing guide device includes a webbing guide component comprising a pin, wherein the edge of the seat belt webbing locates against the pin, and adjustment in position of the pin causes a respective adjustment in the position of the edge of the seat belt webbing relative to the occupant's neck.

Clause 15: The computer-implemented method of any preceding clause, further comprising: receiving, at the device, seat belt fasten data, the seat belt fasten data indicates whether a tongue located on the seat belt is inserted in a buckle utilized to secure the seat belt, wherein the seat belt fasten data is received from a second sensor located in the seat belt buckle.

Clause 16: The computer-implemented method of any preceding clause, further comprising: in response to a determining, by the device, that the seat belt fasten data indicates the tongue is released from the seat buckle, transmitting a second position signal to the webbing guide device, wherein the second position instructs the webbing guide device to return to an initial position, wherein the initial position places the seat belt webbing in a position to enable the car seat to be lowered, and terminating, by the device, at least one of determining physiology of the occupant or positioning of the seat belt webbing.

Clause 17: A computer program product for adjusting position of a seat belt located on a vehicle, the computer program product comprising a computer readable storage medium having program instructions embodied therewith, the program instructions executable by a processor to cause the processor to: determine physiology of an occupant located in a seat onboard the vehicle, determine a position of a seat belt webbing in accordance with the occupant's physiology, and adjust position of the seat belt webbing in accordance with the occupant's physiology.

Clause 18: The computer program product of any preceding clause, wherein the program instructions are further executable by the processor to cause the processor to: receive, from a first sensor, occupant data regarding the physiology of the occupant, based on the occupant data, generate a position instruction to adjust the position of the seat belt webbing in accordance with the occupant's physiology, and transmit the position instruction to a guidance device, wherein the guidance device is configured to adjust the position of the seat belt webbing in response to the position instruction.

Clause 19: The computer program product of any preceding clause, wherein the program instructions are further executable by the processor to cause the processor to, receive, from a second sensor, seat belt data regarding a position of an edge of the seat belt webbing relative to the occupant's body, wherein the position instruction is configured to place the edge of the seat belt webbing at a defined distance between the occupant's neck and the edge of the seat belt webbing.

Clause 20: The computer program product of any preceding clause, wherein the guidance device includes a webbing guide component comprising a pin, wherein the edge of the seat belt webbing locates against the pin, and adjustment in position of the pin causes a respective adjustment in the position of the edge of the seat belt webbing relative to the occupant's neck.

In various cases, any suitable combination of clauses 1-9 can be implemented.

In various cases, any suitable combination of clauses 10-16 can be implemented.

In various cases, any suitable combination of clauses 17-20 can be implemented.

What is claimed is:

1. A vehicle, comprising:
   a webbing guide device comprising a guide pin that is adjustable along a first axis by a motor of the webbing guide device;
   a seat belt comprising a seat belt webbing, wherein an edge of the seat belt webbing abuts the guide pin when the seat belt is worn by an occupant in a seat of the vehicle, wherein movement of the guide pin along the first axis moves a portion of the seat belt webbing comprising the edge of the seat belt webbing that abuts the guide pin along a second axis that is substantially horizontal, and wherein the first axis is different from the second axis;
   a memory that stores computer executable components; and
   a processor that executes at least one of the computer executable components that:
      determines, using at least one sensor of the vehicle, physiology of the occupant located in the seat of the vehicle;
      determines, using the at least one sensor of the vehicle, a position of the seat belt webbing relative to the physiology of the occupant; and
      controls the motor to adjust the guide pin to a first position on the first axis that adjusts the seat belt webbing to a second position on the second axis based on the physiology of the occupant to create a defined distance between a portion of the edge of the seat belt and a portion of a neck of the occupant.

2. The vehicle of claim 1, wherein the at least one of the computer executable components further:
   based on the physiology of the occupant, generates a position instruction to adjust the guide pin to the first position; and
   transmits the position instruction to the webbing guide device, wherein the webbing guide device is configured to adjust positioning of the guide pin in response to the position instruction.

3. The vehicle of claim 1, wherein the at least one sensor comprises at least one of a camera or a radar device.

4. The vehicle of claim 1, wherein the at least one of the computer executable components further:
   determines, using the at least one sensor, a position of the portion of the edge of the seat belt webbing relative to the portion of the neck of the occupant.

5. The vehicle of claim 1, wherein the at least one of the computer executable components further:
   receives, from a sensor of the at least one sensor, seat belt fasten data, the seat belt fasten data indicates whether a tongue located on the seat belt is inserted in a seat belt buckle utilized to secure the seat belt, wherein the sensor is located in the seat belt buckle.

6. The vehicle of claim 5, wherein the at least one of the computer executable components further:
   in response to a determination that the seat belt fasten data indicates the tongue is released from the seat belt buckle, transmit a position instruction to the webbing guide device, wherein the position instruction controls the webbing guide device to return the guide pin to an initial position on the first axis, wherein the initial position places the seat belt webbing in a position on the second axis to enable the seat to be lowered.

7. The vehicle of claim 6, wherein the at least one of the computer executable components further:
   in response to a determination that the seat belt fasten data indicates the tongue is released from the seat belt buckle, cease at least one of the determining the physiology of the occupant or positioning of the seat belt webbing.

8. The vehicle of claim 1, wherein the seat belt is part of a three-point seat belt system.

9. A computer-implemented method comprising:
   determining, by a system comprising a processor located on a vehicle, using at least one sensor of the vehicle, physiology of an occupant located in a seat of the vehicle, wherein the vehicle comprises:
      a webbing guide device comprising a guide pin that is adjustable along a first axis by a motor of the webbing guide device, and
      a seat belt comprising a seat belt webbing, wherein an edge of the seat belt webbing abuts the guide pin when the seat belt is worn by the occupant in the seat of the vehicle, wherein movement of the guide pin along the first axis moves a portion of the seat belt webbing comprising the edge of the seat belt webbing that abuts the guide pin along a second axis that is substantially horizontal, and wherein the first axis is different from the second axis;

determining, by the system, using the at least one sensor, a position of the seat belt webbing relative to the physiology of the occupant; and controlling, by the system, the motor to adjust the guide pin to a first position on the first axis that adjusts the seat belt webbing to a second position on the second axis based on the physiology of the occupant to create a defined distance between a portion of the edge of the seat belt and a portion of a neck of the occupant.

10. The computer-implemented method of claim 9, further comprising:

based on the physiology of the occupant, generating, by the system, a position instruction to adjust the guide pin to the first position; and transmitting, by the system, the position instruction to the webbing guide device, wherein the webbing guide device is configured to adjust positioning of the guide pin in response to the position instruction.

11. The computer-implemented method of claim 9, wherein the at least one sensor comprises at least one of a camera or a radar device.

12. The computer-implemented method of claim 9, further comprising:

determining, by the system, using the at least one sensor, a position of the portion of the edge of the seat belt webbing relative to the portion of the neck of the occupant.

13. The computer-implemented method of claim 9, further comprising:

receiving, by the system, from a sensor of the at least one sensor, seat belt fasten data, the seat belt fasten data indicates whether a tongue located on the seat belt is inserted in a seat belt buckle utilized to secure the seat belt, wherein the sensor is located in the seat belt buckle.

14. The computer-implemented method of claim 13, further comprising:

in response to determining that the seat belt fasten data indicates the tongue is released from the seat belt buckle, transmitting, by the system, a position instruction to the webbing guide device, wherein the position instruction controls the webbing guide device to return the guide pin to an initial position on the first axis, wherein the initial position places the seat belt webbing in a position on the second axis to enable the seat to be lowered; and terminating, by the system, at least one of the determining the physiology of the occupant or positioning of the seat belt webbing.

15. A computer program product comprising a non-transitory computer readable storage medium having program instructions embodied therewith, the program instructions executable by a processor of a vehicle to cause the processor to:

determine, using at least one sensor of the vehicle, physiology of an occupant located in a seat of the vehicle, wherein the vehicle comprises:

a webbing guide device comprising a guide pin that is adjustable along a first axis by a motor of the webbing guide device, and a seat belt comprising a seat belt webbing, wherein an edge of the seat belt webbing abuts the guide pin when the seat belt is worn by the occupant in the seat of the vehicle, wherein movement of the guide pin along the first axis moves a portion of the seat belt webbing comprising the edge of the seat belt webbing that abuts the guide pin along a second axis that is substantially horizontal, and wherein the first axis is different from the second axis;

determine, using the at least one sensor, a position of the seat belt webbing relative to the physiology of the occupant; and control the motor to adjust the guide pin to a first position on the first axis that adjusts the seat belt webbing to a second position on the second axis based on physiology of the occupant to create a defined distance between a portion of the edge of the seat belt and a portion of a neck of the occupant.

16. The computer program product of claim 15, wherein the program instructions are further executable by the processor to cause the processor to:

based on the physiology of the occupant, generate a position instruction to adjust the guide pin to the first position; and transmit the position instruction to the webbing guide device, wherein the webbing guide device is configured to adjust positioning of the guide pin in response to the position instruction.

17. The computer program product of claim 15, wherein the program instructions are further executable by the processor to cause the processor to:

determine, using the at least one sensor, a position of the portion of the edge of the seat belt webbing relative to the portion of the neck of the occupant.

18. The computer program product of claim 15, wherein the at least one sensor comprises at least one of a camera or a radar device.

19. The computer program product of claim 15, wherein the program instructions are further executable by the processor to cause the processor to:

receive, from a sensor of the at least one sensor, seat belt fasten data, the seat belt fasten data indicates whether a tongue located on the seat belt is inserted in a seat belt buckle utilized to secure the seat belt, wherein the sensor is located in the seat belt buckle.

20. The computer program product of claim 19, wherein the program instructions are further executable by the processor to cause the processor to:

in response to determining that the seat belt fasten data indicates the tongue is released from the seat belt buckle, transmit a position instruction to the webbing guide device, wherein the position instruction controls the webbing guide device to return the guide pin to an initial position on the first axis, wherein the initial position places the seat belt webbing in a position on the second axis to enable the seat to be lowered, and terminate at least one of the determining the physiology of the occupant or positioning of the seat belt webbing.

* * * * *